Oct. 6, 1959 R. YII 2,907,896

PULSE GENERATING CIRCUIT

Filed Feb. 13, 1956

INVENTOR.
ROLAND YII
BY Ralph K. Bonell
AGENT

United States Patent Office 2,907,896
Patented Oct. 6, 1959

2,907,896

PULSE GENERATING CIRCUIT

Roland Yii, Broomall, Pa., assignor to Burroughs Corporation, Detroit, Mich., a corporation of Michigan Application February 13, 1956, Serial No. 564,927
11 Claims. (Cl. 307—88.5)

This invention relates to mechanically operable switching apparatus for generating electrical pulses and particularly to circuit means for improving the form of the generated pulses.

In computing and control equipment a pulse of short duration frequently is employed to trigger or produce a change of state of a component circuit or circuits of the equipment. The triggering of bistable circuits or flip-flops is an example of such action. In practically all such cases the exact instant at which the change of state occurs is significant and must be well defined. This requires trigger pulses having clean edges of steep slope over the effective portions thereof. These characteristics, however, are not commonly found in pulses generated by switching devices which mechanically make and break a circuit comprising a source of voltage. Examples of such devices are: telephone-type dials, relays, push buttons, and commutators. Instead, because of contact bounce, variable contact resistance, sparking, etc., the pulses produced, in the absence of auxiliary circuit means, have poorly defined edges and often a single make or break produces a train of pulses, more than one of which may be of sufficient amplitude to trigger the operated circuit, so that multiple operation occurs where only a single operation is desired. This is a potential source of error when, for example, flip-flop counting circuits are employed to count pulses generated by mechanically operated switches.

The present invention provides a circuit, including transistors, whereby instead of a rough and possible multiple-peak pulse resulting from the mechanical making or breaking of a circuit, a single effective pulse of clean contour is produced. The leading edge of this pulse, for example, may have a rise time of the order of a microsecond or less, the lower limit of this rise time value being determined by the time required for the transistors used to reach saturation from a cut-off condition. Alternate circuit arrangements are described whereby either positive-going or negative-going output pulses may be obtained. The transistors used preferably are of the junction type, including one, each, of the p-n-p and n-p-n configurations.

It is an object of the invention to provide improved means for delivering a well defined electrical pulse of selected amplitude as a result of the making or breaking of a circuit comprising a source of voltage.

Another object is to provide improved means operable in conjunction with mechanical circuit interrupting means to generate a pulse adapted to trigger a bistable or like circuit.

Another object is to provide means adapted for use in conjunction with a mechanically operable generator of electrical pulses to deliver pulses having clean edges of steep slope.

A further object is to provide means for obtaining a single effective trigger pulse in response to the operation of means otherwise supplying a train of pulses of random amplitude, more than one of which might be of sufficient amplitude to effect a triggering operation.

Other objects and advantages of the invention will be apparent upon consideration of the following specification taken in conjunction with the appended drawings in which.

Figure 3:
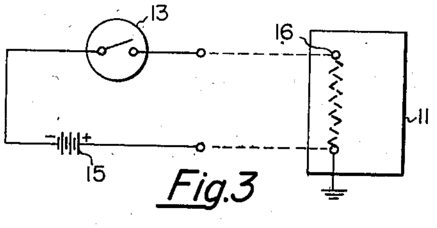
Fig. 3 is a circuit diagram for purposes of explanation.
Figure 4:
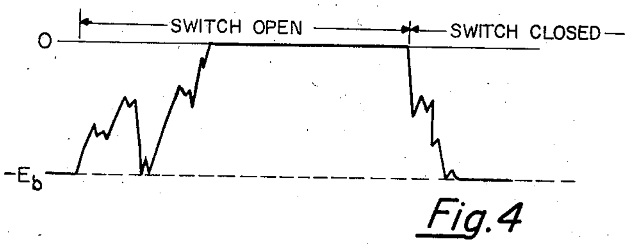
Fig. 4 is a wave diagram relating to the operation of the circuit of Fig. 3.

As an aid in describing certain general features of mechanically-operated pulse generating apparatus, there is shown in Fig. 3 a simple pulse circuit (not including the novel features of the invention) and in Fig. 4 a simplified typical waveform of the voltage applied to an actuated circuit 11, or as might be displayed on a D.C. oscilloscope, upon the making and breaking of the circuit by interrupting means or switch 13.

In the wave diagram of Fig. 4 switch 13 is assumed to be closed initially so that the full voltage $-E_b$, of positive grounded battery 15 is applied to terminal 16. While the switch is being operated to an open position and before the voltage of terminal 16 returns to zero, several major peaks are shown as occurring in the wave, which may be taken to be typical of contact bounce, together with minor serrations representing sparking and other effects. A pulse having a ragged leading edge of this character is unsuitable for precise triggering of a bistable circuit, for example, and since the several peaks which may occur have more or less unpredictable amplitudes, even careful amplitude discrimination may not be sufficient to prevent multiple operation of an actuated circuit, more particularly when this circuit is of the type where each input pulse of sufficient amplitude causes an operation. A form somewhat similar to that of the leading edge is shown for the trailing edge of the wave, which is a result of the operational, as opposed to fortuitous, closing of the switch.

Figure 1:
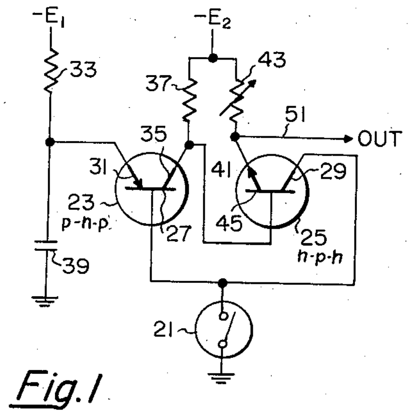
Fig. 1 is a circuit diagram showing one embodiment of the invention.
Figure 2:
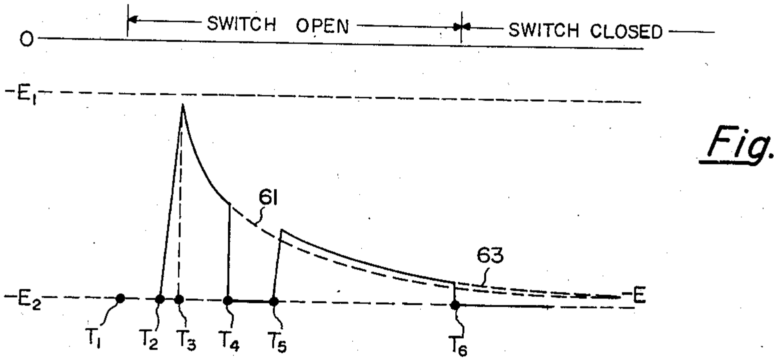
Fig. 2 is a wave diagram of the output voltage of the circuit of Fig. 1.

By way of contrast, Fig. 2 illustrates the well-defined form of wave resulting from the operation of the circuit of the invention, as disclosed in Fig. 1, and other figures described hereinafter. Although two pulses are shown which are assumed to occur during a single operation of a circuit interrupting device, the initial pulse has a much greater peak amplitude than the succeeding one, and, as will be explained later, the ratio of the amplitudes of the peaks is controllable, within limits, by circuit design and adjustment. Therefore, the second pulse, and later ones if they occur, can be eliminated by amplitude discrimination or the effect nullified by adjustment of the sensitivity of the load or actuated circuit.

In the circuit of Fig. 1, embodying the principles of the invention, switch 21 is representative of any mechanically operable circuit interrupting means used to generate a pulse or sequence of pulses. Switch 21 is connected to make and to break ground connections for both the base of transistor 23 and the collector of transistor 25. These transistors preferably are of the junction type and for the generation of positive-going pulses transistor 23 is of the p-n-p variety while transistor 25 is of the n-p-n variety. For the generation of negative-going pulses the two transistors are interchanged in circuit position, with reversal in polarity of the operating potentials. Arrangements for generating positive-going pulses, only, will be considered hereinafter unless otherwise stated.

A negative bias $-E_1$ is applied to the emitter 31 of transistor 23 by way of resistor 33, and a negative potential $-E_2$ is applied to the collector 35 by way of resistor 37. Condenser 39 is connected between emitter 31 and ground. Negative potential $-E_2$ also is applied to the emitter 41 of transistor 25 by way of resistor 43, which may be variable, as shown. The resistance value of resistor 33 is much greater than that of resistors 37 and 43 in parallel. Base 45 of transistor 25 is directly connected to collector 35 of transistor 23, and collector 29 of the former transistor is connected to base 27 of the latter, the bases and collectors of the two transistors thus being cross-connected.

The operation of the circuit of Fig. 1 in producing pulses having the form illustrated in Fig. 2 is as follows: With switch 21 closed, transistor 23 is biased beyond cut-off by the potential $-E_1$ applied to emitter 31, the base being grounded. Transistor 25 operates as an emitter follower and at this time is at or near cut-off, due to the approximate equality of the potentials of emitter 41 and base 45. Output lead 51, connected to the circuit of emitter 41, is approximately at the supply potential $-E_2$. When switch 21 is operationally opened at a time $T_1$, base 27 of transistor 23 is disconnected from ground, as is also collector 29 of transistor 25. The potential of base 27 then tends to follow that of its own collector 35, dropping from ground potential toward $-E_2$, due to the loss of charge of the effective capacitances of the two transistor collector circuits, including the inherent capacitances of the transistors themselves and stray capacitances acting therewith. The rate at which the potential of base 27 drops is determined by the value of these capacitances and the inherent collector resistances of transistors 23 and 25 in parallel, the time constant for this change being the product of these two factors. This time constant can be made very small and is one factor which determines the delay, after switch 21 opens in the start of the rise in output voltage, that is, the delay $T_2-T_1$.

No change in output voltage at lead 51 occurs as long as transistor 23 remains cut off. When, however, the potential of base 27 approaches or reaches that of emitter 31, collector circuit conduction commences and the potential of collector 35 begins to rise from $-E_2$ toward the base potential, due to the drop in resistor 37. This occurs at the time $T_2$. When the potential of collector 35 approaches that of base 27 transistor 23 becomes saturated, at the time $T_3$. Due to the direct connection of collector 35 to base 45 of transistor 25 and to the emitter-follower role of the latter transistor, the rise in potential of collector 35 produces a simultaneous rise in the potential of output lead 51, as shown in Fig. 2, commencing at time $T_2$ and terminating at the first peak in this voltage wave, at time $T_3$, when transistor 23 saturates.

During the period when transistor 23 is in its active region, transistor 25 is also in its active region because of the respective directions in which its emitter and collector diodes are biased. The potential of emitter 41 tends to follow the potential of its base 45 and the two transistors, because of the circuit configuration, saturate at the same time, when, as shown, their collector diodes are biased in the same direction.

The rise time of the leading edge of the first pulse of Fig. 2 is determined, then, by the period between the start of conduction in transistor 23 and the occurence of saturation in the transistor and likewise in transistor 25. When both transistors reach saturation, capacitor 39 charges rapidly, principally from the source of potential $-E_2$, through parallel-connected resistors 37 and 43 since, under conditions of saturation, the normally high collector circuit resistances of the transistors becomes very low, for practical purposes a short circuit, and the emitter resistances remain low. The potential of the ungrounded side of the capacitor, therefore, tends to approach the value $-E_2$.

When the peak of the first output pulse is reached at $T_3$, the output voltage has approached the value of $-E_1$.

Subsequently this voltage drops off exponentially and tends to approach some final value $-E$, asymptotically, as shown by curve 61, $-E$ being higher, or less negative, than $-E_2$. The time constant of this decay is the product of the capacitance of capacitor 39 and the resistance of resistors 37 and 43 in parallel, since the delay results principally from the change of charge of the capacitor due to current drawn through these resistors.

So far, a single pulse, only, in the output wave of Fig. 2 has been considered. If, due to contact bounce or other cause, the contacts of switch 21 fortuitously come together after the initial operational opening of the switch, transistor 23 returns to a cut-off condition and its emitter becomes biased in a reverse direction. The ungrounded plate of capacitor 39 tends to return to the potential $-E_1$, the change of charge of this capacitor occurring largely by reason of current drawn through resistor 33, and being subject to the long time constant of the circuit. The output voltage at lead 51 instead of continuing along curve 61 drops rapidly to the value $-E_2$, as shown at $T_4$ in Fig. 2. When the switch contacts, in their chance operation, again open at $T_5$ the described cycle is repeated except that the peak amplitude of the second output pulse is greatly reduced relative to that of the first pulse. This is due to the fact that capacitor 39, whose potential controls this peak through its connection to emitter 31, has had only a short time to change its potential from $-E$ to a higher or less negative potential and because of the slow rate at which such a change can occur, as above described. The second peak normally reaches a value somewhat above curve 61 and the output voltage then decays along a new exponential curve 63. The operational closing of switch 21 occurs at $T_6$.

Summarizing the foregoing action, in the operation of the circuit of Fig. 1 successive pulses in the output voltage wave, due to contact bounce or like fortuitous causes, decreases rapidly in peak amplitude since these pulses are separated in time by relatively short intervals and their peak values are determined by the instantaneous potential of capacitor 39 whose charge, which determines its potential, changes by way of a circuit of long time constant. Accordingly either amplitude discrimination or sensitivity adjustment can readily be employed to insure that only the first peak is effective to actuate a succeeding circuit.

Typical values of the components of the circuit of Fig. 1 and of the operating potentials when using a particular type of transistor are:

| | | |
|---|---|---|
| Resistor 33 | ohms | 1500 |
| Resistor 37 | do | 1000 |
| Resistor 43 | do | 1000 |
| Capacitor 39 | mf | 0.5 |
| $-E_1$ | volts | $-1.5$ |
| $-E_2$ | do | $-12$ |

Figure 5:
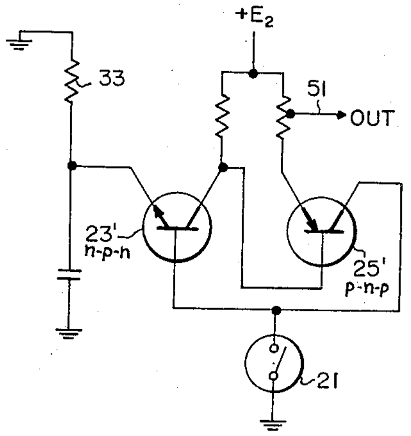
Figs. 5 and 6 are circuit diagrams showing modifications of the circuit of Fig. 1.

The circuit of Fig. 5 is similar to that of Fig. 1 except that as a simplification, the emitter of transistor 23 is connected ot ground rather than to a source of negative potential, thus eliminating one such source. The transistors in the circuit of this figure are arranged to supply a negative-going pulse and $E_2$ is positive. With a finite value for resistor 33 transistor 23 is never actually cut off (as previously described) but the approach to this condition is sufficient for practical purposes. The operation of the circuit closely follows that of the circuit of Fig. 1.

Figure 6:
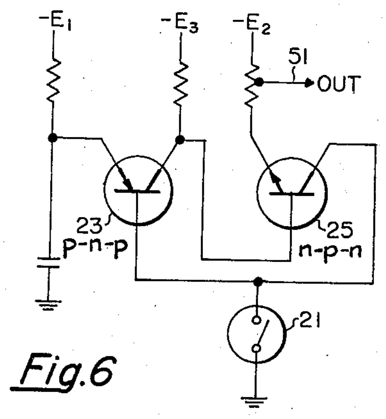

The circuit of Fig. 6 departs from that of Fig. 1 in that the collector of transistor 23 and the emitter of transistor 25 are connected to individual sources of potential, $-E_3$ and $-E_2$ respectively. As before, with the two transistors interchanged positive potentials are used. The absolute value of $E_3$ should be greater than that of $E_2$, whichever their sign. While this circuit modification increases the number of sources of potential it provides another variable which can be manipulated in adjusting performance of the circuit. The time constant for the fall of the base potential of transistor 23 again is controlled by the collector capacitances and collector resistances of the transistors.

When periodic makes and breaks occur through the operation of switch 21, a condition for satisfactory circuit operation is that the time constant defined by capacitor 39 and resistor 33 (Fig. 1) must be smaller than the time the switch remains operatively closed. Otherwise the peak amplitudes of the successive initial or principal output pulses decreases in value. The highest value of capacitance for capacitor 39 that can be used is limited by the need for a relatively short time constant when the capacitor charges from $-E_1$ to $-E_2$ through resistors 37 and 43 in parallel. Since the collector resistance for some types of transistors is greater than the reverse emitter resistance, some improvement may be obtained in such cases if transistor 23 is inverted, that is, if the collector is connected in the place of the emitter, and vice versa.

The points in the several circuits maintained at ground or reference potential are optional and in practice their choice will depend on considerations such as the type of output coupling, type of actuated circuit, etc. For example, in the circuit of Fig. 1, with attention to other circuit details, resistors 37 and 43 may be connected to ground and a source of positive potential $+E_2$ applied to the conductors shown in that figure as grounded.

While in the above descriptions of several modifications of the invention junction transistors have been principally referred to, and are preferred, at least one of the two transistors of the circuit may be replaced with a suitable transistor of a different type, such as the point contact type, the adjustments for converting from one type to another following known circuit principles.

The embodiments of the invention described herein are by way of illustration and not of limitation of the invention. The limits of the invention are defined solely in the appended claims.

What is claimed is:

1. In a circuit for generating pulses as a result of the mechanical operation of circuit interrupting means, the combination of first and second transistors each having an emitter, a base and a collector, individual circuit means for supplying biasing potentials to the emitters of said transistors relative to the bases thereof including first and second resistors, respectively, circuit means including a third resistor for applying an operating potential to the collector of said first transistor, means connecting said last-named collector to the base of said second transistor, a capacitor connected between the emitter of said first transistor and a source of reference potential, a common connection from the collector of said second transistor and the base of said first transistor to said source of reference potential, mechanically operable circuit interrupting means in said common connection, and means for obtaining an output voltage derived from the emitter circuit of said second transistor, said second transistor in the uninterrupted condition of said common connection operating as an emitter follower.

2. The combination defined in claim 1 wherein said two transistors are junction transistors, said first transistor being of the p-n-p variety and said second transistor of the n-p-n variety, and said biasing and operating potentials are negative with respect to said reference potential.

3. The combination defined in claim 1 wherein said two transistors are junction transistors, said first transistor being of the n-p-n variety and said second transistor of the p-n-p variety.

4. The combination defined in claim 1 wherein the potential supplied to the emitter of said second transistor is of the same sign but greater in magnitude than the potential applied to the emitter of said first transistor.

5. The combination defined in claim 4 wherein the potentials applied to the emitter of said second transistor and the collector of said first transistor are derived from the same source by way of said second and third resistors, and the resistance value of said first resistor is higher than the value of said second and third resistors in parallel.

6. The combination defined in claim 4 wherein the resistance value of said first resistor is lower than the reverse emitter resistance of said first transistor.

7. A circuit for generating pulses as a result of the operation of a mechanically operable switch comprising in combination first and second transistors, means directly connecting the collector of said first transistor to the base of said second transistor, means directly connecting the collector of said second transistor and the base of said first transistor, a mechanically operable switch for selectively simultaneously connecting said two last-named elements to a source of reference potential, circuit means including resistors supplying operating potentials to said two transistors, said first transistor being in a substantially cut-off condition and said second transistor operating as an emitter follower receiving an input therefrom when said switch is closed, circuit means for obtaining an output from the emitter circuit of said second transistor, and a capacitor connected between the emitter of said first transistor and said source of reference potential, the charge and discharge of said capacitor being governed by different time constants according to the currently existing operating states of said transistors.

8. The combination defined in claim 7 wherein the first transistor is of the p-n-p variety, the second transistor is of the n-p-n variety and the operating potential applied to the emitter of the second transistor is of greater absolute magnitude than the operating potential applied to the emitter of the first transistor.

9. The combination defined in claim 7 wherein the first transistor is of the p-n-p variety, the second transistor is of the n-p-n variety and the operating potentials supplied to the emitter of the first transistor, the collector of the first transistor and the emitter of the second transistor have different magnitudes.

10. The combination defined in claim 7 wherein the first transistor is a p-n-p transistor, the second transistor is an n-p-n transistor, and the resistance of the resistor supplying the operating potential to the emitter of the first transistor is greater than resistance in parallel, of the resistors supplying operating potentials to the collector of the first transistor and the emitter of the second transistor.

11. The combination defined in claim 7 wherein the first transistor is of the n-p-n variety, the second is a transistor of the p-n-p variety, and the operating potential supplied to the emitter of the first transistor is at reference potential.

References Cited in the file of this patent

Linvill: "Nonsaturating Pulse Circuits Using Two Junction Transistor," Proc. I.R.E., July 1955, pp. 826–833.